(12) United States Patent
Zang et al.

(10) Patent No.: US 9,448,770 B2
(45) Date of Patent: Sep. 20, 2016

(54) SOURCE CODE EDITOR

(71) Applicants: Yan Zang, Singapore (SG); Xin Ye, Beijing (CN)

(72) Inventors: Yan Zang, Singapore (SG); Xin Ye, Beijing (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/583,801

(22) Filed: Dec. 29, 2014

(65) Prior Publication Data

US 2016/0188301 A1   Jun. 30, 2016

(51) Int. Cl.
*G06F 9/44*   (2006.01)

(52) U.S. Cl.
CPC .................................... *G06F 8/33* (2013.01)

(58) Field of Classification Search
None
See application file for complete search history.

(56) References Cited

U.S. PATENT DOCUMENTS

2012/0131547 A1*   5/2012   Muir .................. G06F 8/20
717/109

\* cited by examiner

*Primary Examiner* — Qamrun Nahar
(74) *Attorney, Agent, or Firm* — Horizon IP Pte. Ltd.

(57) ABSTRACT

Disclosed herein are technologies for facilitating source code editing. In accordance with one aspect, a request for an editing feature is received in response to an editing operation associated with a library. In response to the request, metadata may be extracted from the source code file of the library and used to present the editing feature.

20 Claims, 6 Drawing Sheets

```
/**
 * Creates an instance of Circle.
 *
 * @constructor
 * @this {Circle}
 * @param {number}  r   The desired radius of the circle.
 */
function Circle (r) {
        /** @private */ this.radius = r;
        /** @private */ this.circumference = 2 * Math.PI * r;
}

/**
 * Creates a new Circle from a diameter.
 *
 * @param {number} d The desired diameter of the circle.
 * @return {Circle} The new Circle object.
 */
Circle. fromDiameter = function (d) {
        return new Circle (d / 2);
};

/**
 * Calculates the circumference of the Circle.
 *
 * @deprecated
 * @this {Circle}
 * @return {number}  The circumference of the circle.
 */
Circle.prototype.calculateCircumference = function ( ) {
        return 2 * Math.PI * this.radius;
};
```

SOURCE CODE EDITOR

TECHNICAL FIELD

The present disclosure relates generally to a source code editing framework.

BACKGROUND

Source code editors are text editors that enable a user (e.g., software developer, programmer, coder, designer, etc.) to edit source code. It may be a standalone software application or built into an integrated development environment (IDE). Some source code editors are made available to users on demand via the Internet from cloud computing provider's servers (i.e., cloud-based).

Common editing features provided by source code editors include syntax checking while the user types, providing warning of syntax problems, autocomplete (or code assistance), syntax highlighting, and so forth. For example, autocomplete (or code assistance) is a convenient feature that involves the source code editor predicting a word or phrase that the user wants to type without the user typing it completely, and providing suggestions for the user to select. Such editing features typically support native language elements (e.g., JavaScript) and some common third party open source libraries (e.g., node.js, express, etc.). Such editing features rely on metadata to obtain information on the structure of the programming elements, such as the signature of the object, parameter type of the application programming interface (API), etc. Such metadata is typically manually generated based on the relevant language standard specification (e.g., ECMAScript specification which formalizes JavaScript).

One problem with conventional source code editors, however, is that they do not readily support the introduction of new third-party libraries. The user may desire to use third-party libraries (e.g., SAP UI5, Apache Cordova, jQuery, etc.) developed by another entity (other than the current user) to improve the efficiency and quality of developing software applications. Such libraries often change frequently, and there is no stable language specification to refer to for manual generation of the metadata. The user typically needs to wait for the provider to release an upgraded version of the source code editor in order to use editing features that support new third-party libraries.

Another problem with conventional source code editors, particularly cloud-based source code editors, is that they require high bandwidth or resources to download or generate the metadata used by the editing features. To support third party libraries, a large amount of metadata may need to be downloaded. Large volumes of source code in user-defined objects may need to be parsed to generate such metadata.

SUMMARY

A computer-implemented technology for facilitating source code editing is described herein. In accordance with one aspect, a request for an editing feature is received in response to an editing operation associated with a library. In response to the request, metadata may be extracted from the source code file of the library and used to present the editing feature.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4 shows an exemplary source code segment; and

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

The framework described herein may be implemented as a method, computer-controlled apparatus, a computer process, a computing system, or as an article of manufacture such as a computer-usable medium.

One aspect of the present framework provides a source code editor that dynamically supports the importation of new or updated libraries. Such new or updated libraries include one or more reusable software components that have not been previously supported by the source code editor. The framework dynamically generates metadata based on these new or updated libraries. The metadata may be used by the source code editor to provide editing features when the user (e.g., software developer) employs software components of these libraries into the current project source code. Such metadata may be packaged into compressed files to advantageously reduce the number of downloading requests. These and various other features and advantages will be apparent from the following description.

For illustration purposes, the present framework may be described in the context of providing an autocomplete editing feature. It should be appreciated, however, that the present framework may also be applied to provide other types of editing features, such as auto-hint, go to or view definition for a library-defined object, other language reflection feature, and so forth.

Figure 1:
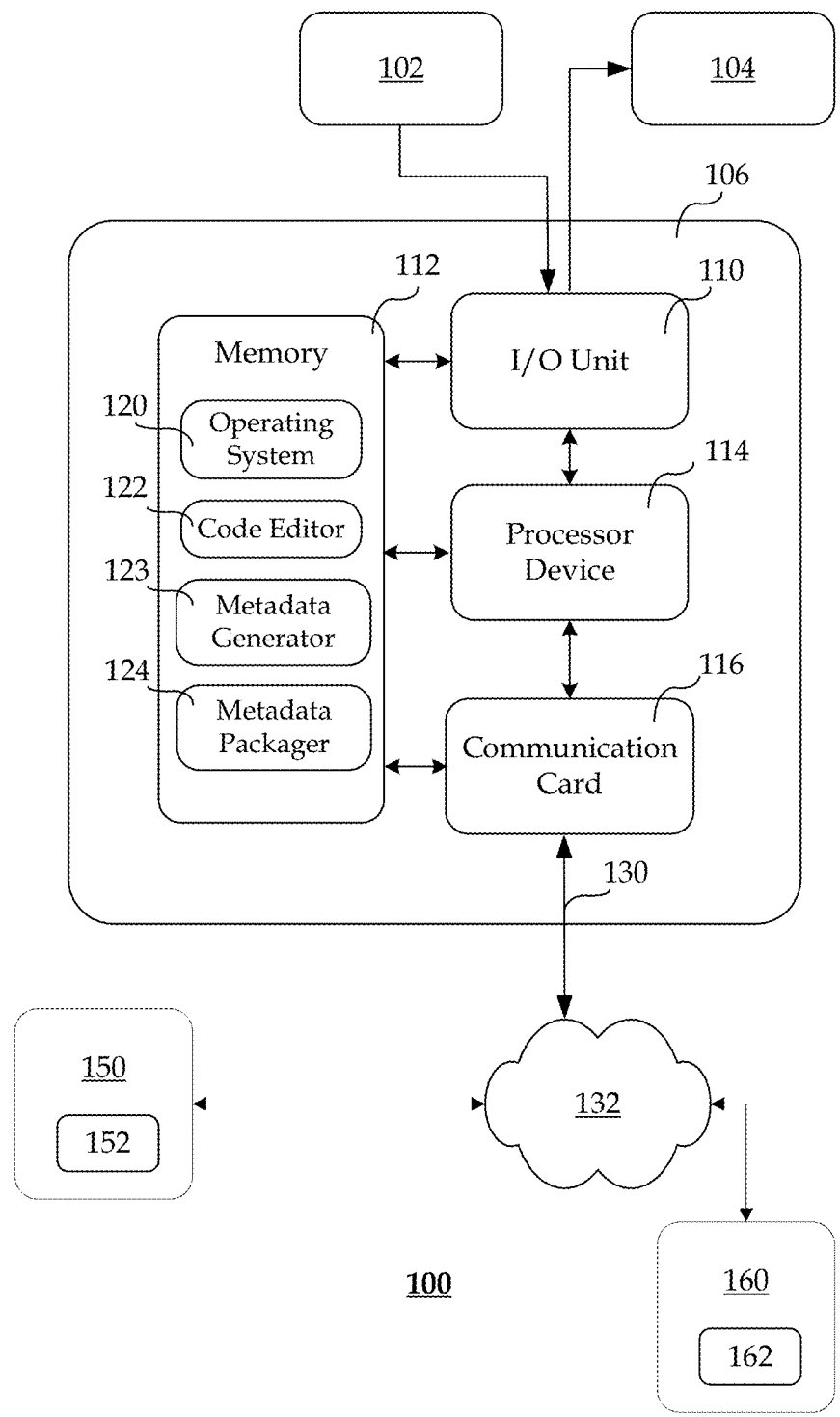
FIG. 1 is a block diagram illustrating an exemplary system.

FIG. 1 shows a block diagram illustrating an exemplary system 100 that may be used to implement the framework described herein. System 100 includes a computer system 106 communicatively coupled to an input device 102 (e.g., keyboard, touchpad, microphone, camera, etc.) and an output device 104 (e.g., display device, monitor, printer, speaker, etc.). Computer system 106 may include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN). The computer system 106 may be communicatively coupled to one or more other computer systems 150 and 160 via network 132. For example, computer system 106 may act as a server and operate in a networked environment using logical connections to one or more client computers 150.

Computer system 106 includes a processor device or central processing unit (CPU) 114, an input/output (I/O) unit 110, and a memory module 112. Other support circuits, such as a cache, power supply, clock circuits and a communications bus, may also be included in computer system 106. In addition, any of the foregoing may be supplemented by, or incorporated in, application-specific integrated circuits. Examples of computer system 106 include a handheld device, a mobile device, a personal digital assistance (PDA), a workstation, a server, a portable laptop computer, another portable device, a mini-computer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various programs, such as an operating system 120, a code editor 122, a metadata generator 123 and a metadata packager 124 for implementing the techniques described herein, all of which may be processed by processor device 114. As such, the computer system 106 is a general-purpose computer system that becomes a specific purpose computer system when executing the machine-executable instructions. Alternatively, the various techniques described herein may be implemented as part of a software product, which is executed via the operating system 120. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, code editor 122 provides source code editing services, resources and/or features that may be assessed via a user interface 152 (e.g., internet browser) implemented at client computer 150. Code editor 122 may be implemented as part of a cloud or web-based integrated development environment (IDE) that includes additional components, such as a compiler, a debugger and a graphical user interface builder. Alternatively, code editor 122 may operate outside the IDE. The IDE may be used to create, for example, cloud and/or native software applications (or apps). Metadata generator 123 serves to dynamically generate metadata in response to the importation of new libraries (e.g., third-party libraries). Metadata packager 124 serves to package the metadata to improve the performance of editing features. As shown, code editor 122 and metadata packager 124 may reside in the same system 106. Alternatively, they may reside in different systems. For example, metadata packager 124 may provide a remote service to the code editor 122 via a web service.

Computer system 160 may serve to provide one or more third-party libraries 162. The one or more third-party libraries 162 may be imported by the user (e.g., software developer, programmer, etc.) at client computer 150 into a current project. The third-party library 162 may be downloaded or retrieved from the computer system 160 into computer system 106.

It should be appreciated that the different components of the computer system 106 may be located on different machines. For example, code editor 122, metadata generator 123 and metadata packager 124 may reside in different physical machines. It should further be appreciated that the different components of the client computer 150 may also be located in the computer system 106. All or portions of system 100 may be implemented as a plug-in or add-on.

Figure 2:
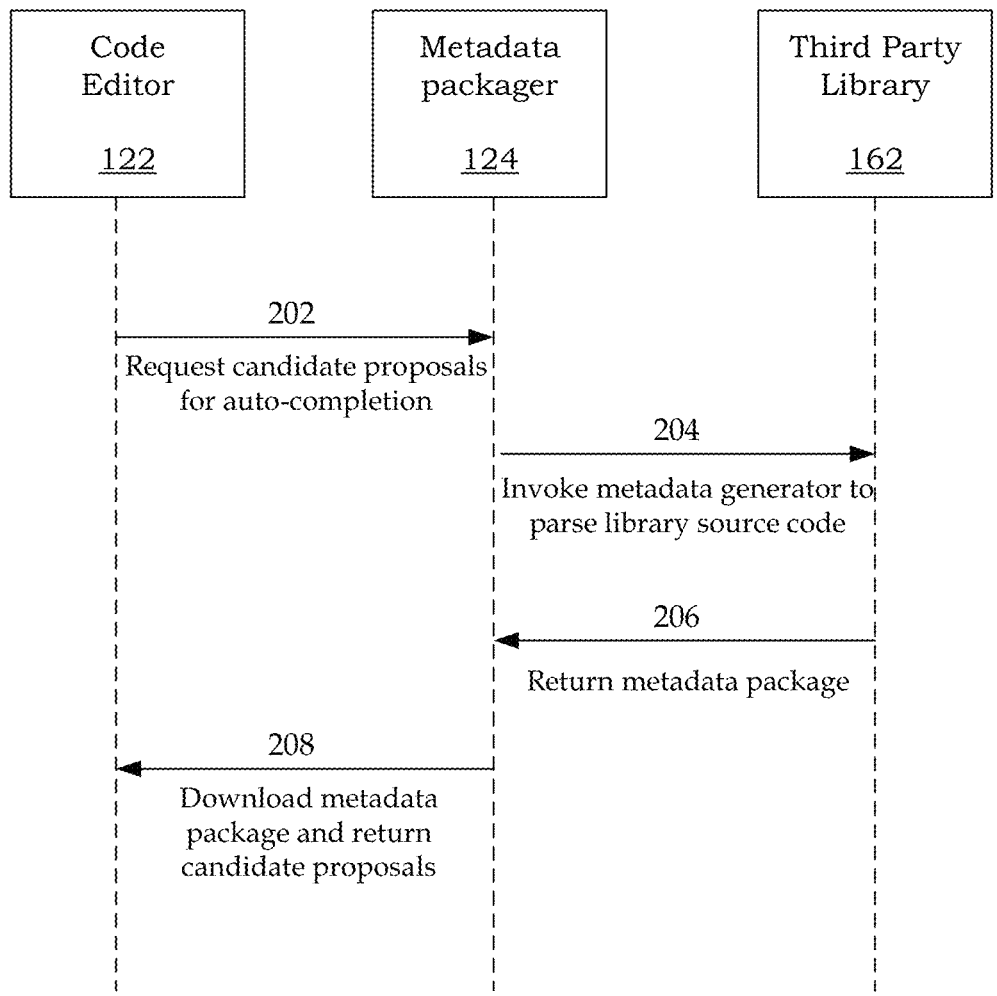
FIG. 2 is a block diagram illustrating an exemplary dynamic metadata generation process flow.

FIG. 2 is a block diagram illustrating an exemplary dynamic metadata generation process flow 200. The computer system 106 of FIG. 1 may be configured by computer program code to implement the process represented by the flow 200. While process flow 200 describes a series of acts that are performed in sequence, it is to be understood that process 200 is not limited by the order of the sequence. For instance, some acts may occur in a different order than that described. In addition, an act may occur concurrently with another act. In some instances, not all acts may be performed.

At 202, code editor requests candidate proposals for auto-completion. It should be appreciated that other types of editing features may also be requested. The auto-completion editing feature may include an auto-completion list, function help text, auto-completion hint, etc. In some implementations, the request is made in response to an editing operation performed within a user interface of the code editor 122. The auto-completion editing feature may be implicitly or explicitly invoked by, for example, typing or entering one or more characters. For example, the editing operation may include entering source code characters during source code editing by the user. The editing operation may be associated with a new or updated library that has not been previously supported by the code editor 122. For example, a user may use the user interface 152 that accesses services of the code editor 122 to enter project source code that employs one or more software components provided by a new or updated third party library 162. Alternatively, the auto-completion editing feature may be explicitly invoked by one or more pre-defined characters (e.g., "ctrl" and "space", user-defined key, etc.) or a menu command.

Figure 3A:
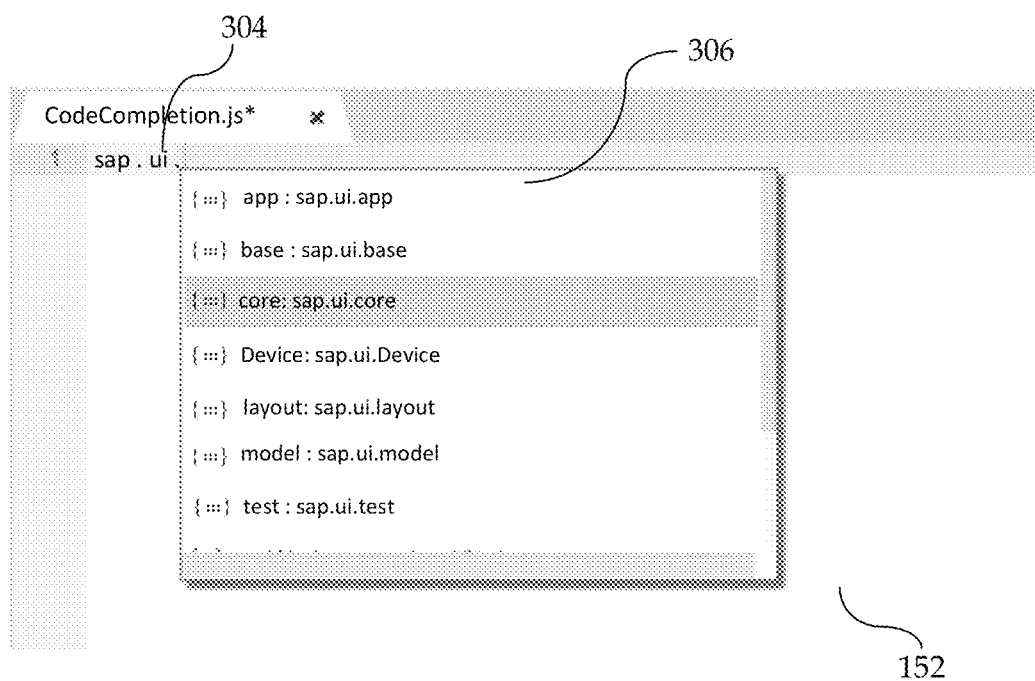
FIGS. 3a-e show exemplary images of a user interface.

FIG. 3a shows an exemplary image of a user interface 152 generated by the code editor 122. A user may initiate the request for auto-completion while editing source code 304. In response to receiving the source code characters 304, the code editor 122 displays a pop-up window 306 containing a list of auto-completion proposals for selection by the user.

Figure 3B:
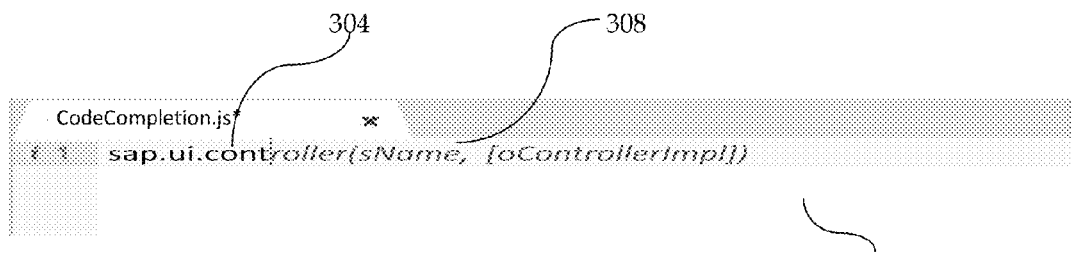
Figure 3C:
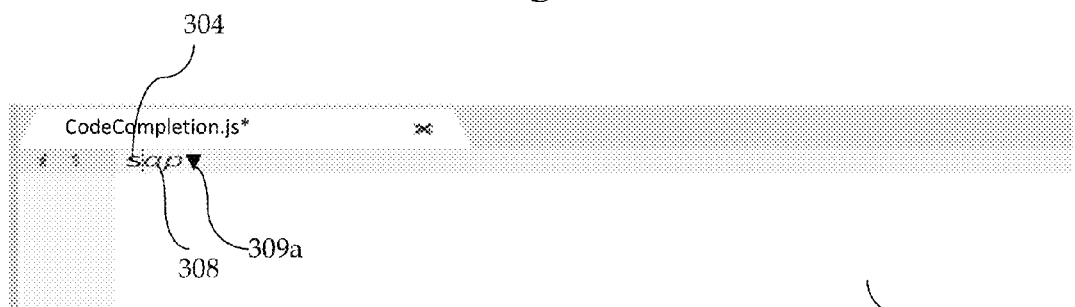
Figure 3D:
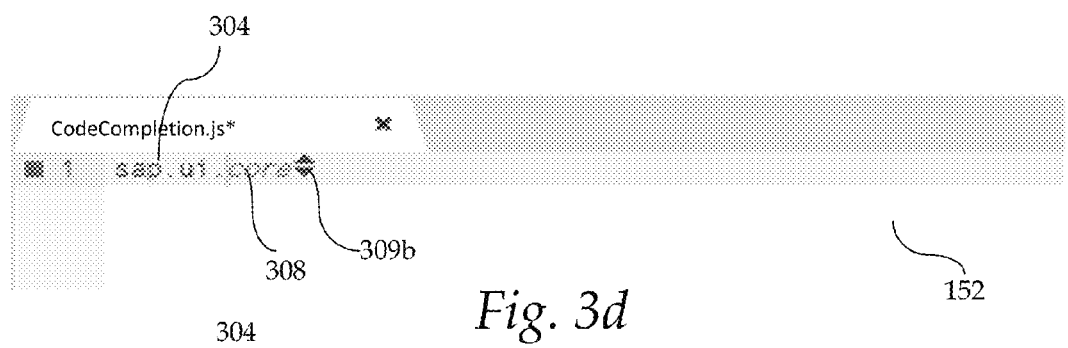
Figure 3E:
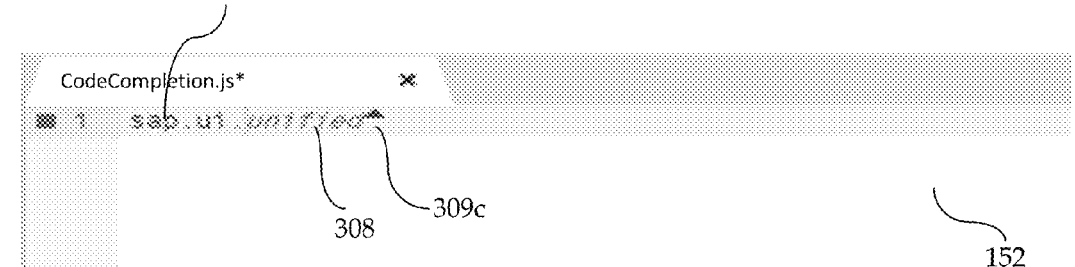

FIGS. 3b-e show other exemplary images of user interface 152 generated by the code editor 122. Referring to FIG. 3b, a user may initiate the request for auto-completion while editing source code 304. In response to receiving the source code characters 304 (e.g., in black color), the code editor 122 automatically provides an auto-completion hint 308 (e.g., in gray color) that completes the current word or line of the source code. In cases where there are more than one candidate proposals for auto-completion available, an element 309*a-c* (e.g., down and/or up arrow icon) may be provided with the auto-completion hint 308 to indicate there are other candidate proposals available for viewing. For example, as shown in FIG. 3*c*, a down arrow icon 309*a* may be provided to indicate that the auto-completion hint 308 corresponds to the first entry of the list of candidate proposals. The user may scroll down the list by using, for example, the "down" key to view the next auto-completion hint. As shown in FIG. 3*d*, up-down arrows icon 309*b* may be provided to indicate that the user may scroll up or down the list of candidate proposals using, for example, the "up" or "down" key to view the previous or next entry. As shown in FIG. 3*e*, an up arrow icon 309*c* may be provided to indicate that the user may scroll up the list of candidate proposals using, for example, the "up" key to view the previous entry.

Returning to FIG. 2, at 204, in response to the request for auto-completion, metadata packager 124 invokes metadata generator 123 to generate metadata. Metadata generator 123 parses third party library 162 to generate static metadata associated with the third party library 162. A user interface 152 may be provided to facilitate the generation of static metadata.

In some implementations, static metadata is generated by parsing a syntax tree (or abstract syntax tree) of the library source code. The syntax tree represents the abstract syntactic structure of the library source code, with each node denoting a construct occurring in the source code. Other types of metadata, representations or data structures are also useful.

FIG. 4 shows an exemplary source code segment 400 provided by the third party library 162. The source code segment 400 may be written in JavaScript or any other language. A markup language (e.g., JSDoc) may be used to annotate the source code segment with comments 402. Comments 402 provide documentation describing the application programming interface (API) of the code. Annotation tags (e.g., @constructor, @this, @param, @return, etc.) may be used to describe specific attributes of the API.

Figure 5:
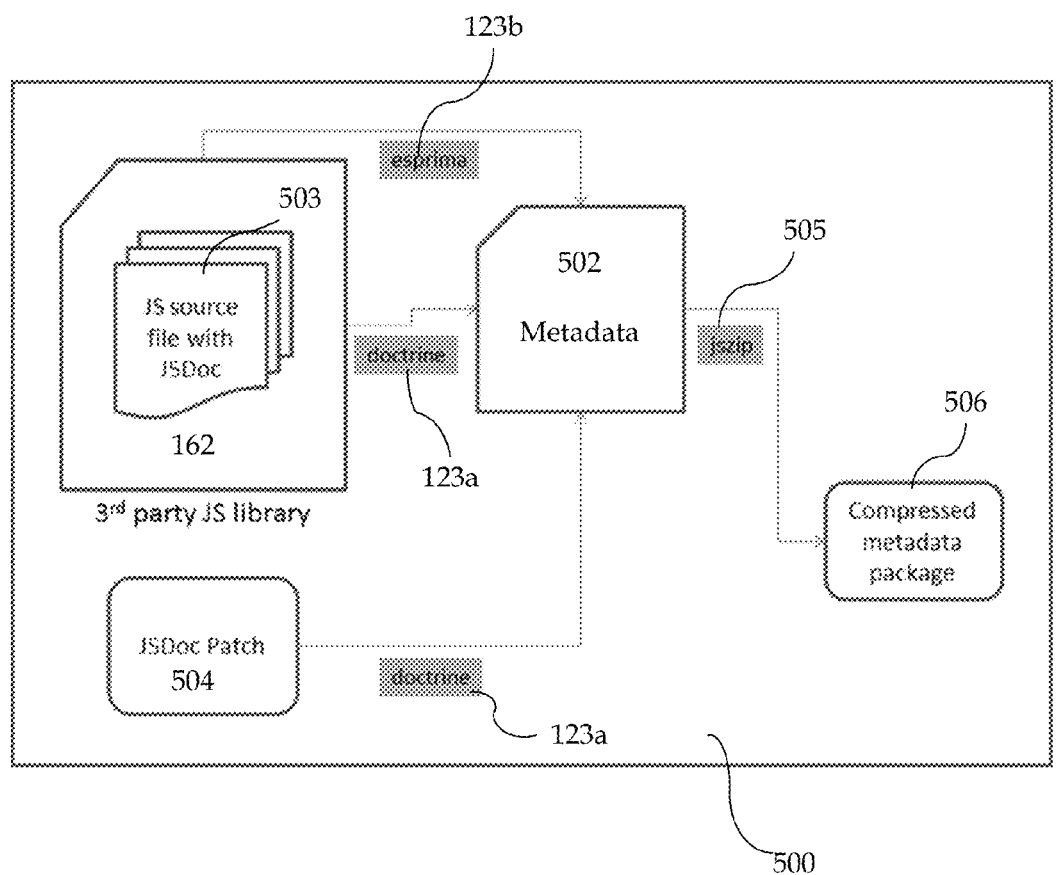
FIG. 5 is a block diagram that illustrates an exemplary generation of a metadata package.

FIG. 5 is a block diagram that illustrates an exemplary generation of a metadata package 506. As shown, the third party library 162 may include several source code files 503 annotated with embedded comments (e.g., JSDoc comments). Metadata packager 124 may first parse each source code file 503 to determine if it is fully or partially annotated with comments. If complete and correct comments are available, metadata packager 124 invokes first metadata generator 123*a* to parse the comments and extract the metadata 502 for supporting editing features (e.g., auto-completion) of the code editor 122. In some implementations, the first metadata generator 123*a* is a JSDoc parser (e.g., doctrine) that extracts JSDoc comments and generates a structured description of the comments that is used as metadata. Other types of metadata generators may also be used.

If the comments in the source code file 503 is incorrect or incomplete (e.g., missing tags, unclosed comments section, etc.), a second metadata generator 123*b* may be invoked. The second metadata generator 123*b* is capable of handling missing or incorrect comments by, for example, comparing what is being documented in the comments with the actual function parameters. In some implementations, second metadata generator 123*b* is a JavaScript parser (e.g., Esprima) that retrieves every comment (including incomplete or incorrect comment) in the source code and links the comment to a related syntax node to generate a syntax tree. It should be appreciated that in some scenarios or implementations, only one metadata generator is used.

A patching mechanism may also be provided to correct the comments by including a patch file 504 outside the library source code that overrides the incorrect or incomplete information in the comments embedded in the source code file 503. Alternatively, the metadata may be generated from scratch based on the actual source code. For example, the metadata may be generated based on actual function parameters 404 or any other source code portions of the library source code file 503.

To improve the performance of the code editing IDE, an asynchronous model may be used to generate metadata. The asynchronous model allows threads to continue to execute without waiting for an operation to complete. A thread of execution refers to the smallest sequence of programmed instructions that can be managed independently by a scheduler (e.g., operating system 120). In some implementations, the thread that generates metadata executes asynchronously without blocking the user interface (UI) thread of the IDE. The UI thread that generates the user interface 152 and allows the user to perform other operations (e.g., source code editing) while the metadata is generated.

In addition, parsing may be performed incrementally to advantageously avoid unnecessary full content parsing. More particularly, existing previously generated metadata may be cached and incrementally updated with extracted metadata associated with changed or added portions of the library source code. For example, if the third party library source code is updated in a new version of the library, the existing syntax tree associated with the old version is retrieved from the system's cache and updated with new metadata associated with the updated portions. User-defined object metadata may be cached to advantageously avoid repeated parsing and metadata generation.

Further, metadata packager 124 may invoke a file compression component 505 (e.g., jzip) to package the metadata into a compressed metadata package 506. The compressed metadata package 506 has a reduced file size that advantageously reduces the number of downloading requests.

Returning to FIG. 2, at 206, the metadata packager 124 returns the compressed metadata package. At 208, code editor 122 receives the metadata package and generates context-based candidate proposals for auto-completion based on the metadata. The candidate proposals may be presented to a user as the user edits program source code in the code editor 122 via user interface 152. The candidate proposals may be in the form of, for example, function help, hints or list of suggestions for completing a word or phrase that the user desires to input without actually entering the word or phrase completely, and so forth.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of facilitating cloud-based source code editing for developing an application, comprising:
   providing a source code editor for generating source code of an application, where the source code editor dynamically supports third party libraries, including new and updated third party libraries not previously supported by the source code editor;

performing an editing function by a user using the source code editor;

invoking an auto-completion editing feature of the source code editor to complete the source code, wherein the auto-completion editing feature provides auto-completion proposals;

invoking a metadata packager for generating a metadata package, wherein the metadata package comprises metadata of third party libraries, including new and updated third party libraries;

providing the metadata package to the source code editor; and providing auto-completion proposals to the user, wherein the auto-completion proposals is based on the metadata in the metadata package.

2. The method of claim 1 wherein generating the metadata package comprises:

parsing comments of source code files of the third party libraries which include,
determining if the source code files of the third party libraries are complete, and
if the source code files are complete, then parsing the comments and extracting the metadata from the source code files, and
if the source code files are incomplete, then analyzing the incomplete source code files to produce metadata from the incomplete source code files.

3. A system comprising:

a non-transitory memory device for storing computer readable program code; and a processor in communication with the memory device, the processor being operative with the computer readable program code to perform source code editing comprising:

providing a source code editor for generating source code of an application, where the source code editor dynamically supports third party libraries, including new and updated third party libraries not previously supported by the source code editor, performing an editing function by a user using the source code editor, invoking an auto-completion editing feature of the source code editor to complete the source code, wherein the auto-completion editing feature provides auto-completion proposals, invoking a metadata packager for generating a metadata package, wherein the metadata package comprises metadata of third party libraries, including new and updated third party libraries, providing the metadata package to the source code editor, and providing auto-completion proposals to the user based on the metadata in the metadata package.

4. The system of claim 3 wherein the editing function is performed in a cloud-based integrated development environment.

5. The system of claim 3 wherein the editing function comprises entering source code via a user interface.

6. The system of claim 3 wherein the editing function comprises entering one or more pre-determined characters.

7. The system of claim 3 wherein the editing function comprises invoking a menu command via a user interface.

8. The system of claim 3 wherein the processor is operative with the computer readable program code to extract the metadata based on actual source code in source code files of the third party libraries to generate the metadata package.

9. The system of claim 3 wherein the processor is operative with the computer readable program code to extract the metadata based on comments in source code files of the third party libraries to generate the metadata package.

10. The system of claim 9 wherein the processor is operative with the computer readable program code to extract the metadata from the third party libraries to generate the metadata package comprising:

invoking a first metadata generator of the metadata packager in response to determining the comments are complete and correct; and invoking a second metadata generator of the metadata packager in response to determining the comments are incorrect or incomplete.

11. The system of claim 9 wherein the processor is operative with the computer readable program code to override the comments that are incorrect or incomplete by using a patch file.

12. The system of claim 3 wherein the processor is operative with the computer readable program code to extract the metadata from the third party libraries by parsing a syntax tree of the third party libraries.

13. The system of claim 3 wherein the processor is operative with the computer readable program code to update existing metadata with the metadata from the third party libraries.

14. The system of claim 3 wherein the metadata package comprises a compressed metadata package.

15. The system of claim 3 wherein the processor is operative with the computer readable program code to generate the metadata package comprising:

parsing comments of source code files of the third party libraries which include,
determining if the source code files of the third party libraries are complete, and
if the source code files are complete, then parsing the comments and extracting the metadata from the source code files, and
if the source code files are incomplete, then analyzing the incomplete source code files to produce metadata from the incomplete source code files.

16. A non-transitory computer-readable medium having stored thereon program code, the program code executable by a computer to perform source code editing comprising:

providing a source code editor for generating source code of an application, where the source code editor dynamically supports third party libraries, including new and updated third party libraries not previously supported by the source code editor;

performing an editing function by a user using the source code editor;

invoking an auto-completion editing feature of the source code editor to complete the source code, wherein the auto-completion editing feature provides auto-completion proposals;

invoking a metadata packager for generating a metadata package, wherein the metadata package comprises metadata of third party libraries, including new and updated third party libraries;

providing the metadata package to the source code editor; and providing auto-completion proposals to the user based on the metadata in the metadata package.

17. The non-transitory computer-readable medium of claim 16 wherein the program code executable by the computer to provide the auto-completion proposals comprises displaying a list of one or more candidate proposals.

18. The non-transitory computer-readable medium of claim 16 wherein the program code executable by the computer to extract the metadata asynchronously with a user interface thread.

19. The non-transitory computer-readable medium of claim 16 wherein the program code executable by the computer to extract the metadata is based on comments in source code files of the third party libraries.

20. The non-transitory computer-readable medium of claim 19 wherein the program code executable by the computer to extract the metadata comprises:
    invoking a first metadata generator of the metadata packager in response to determining the comments are complete and correct, and
    invoking a second metadata generator of the metadata packager in response to
  determining the comments are incorrect or incomplete.

\* \* \* \* \*